US012535148B2

(12) United States Patent
Longoria et al.

(10) Patent No.: US 12,535,148 B2
(45) Date of Patent: Jan. 27, 2026

(54) PRESSURE REGULATORS WITH SELF-ALIGNING VALVE DISK ASSEMBLIES

(71) Applicant: Emerson Process Management Regulator Technologies, Inc., McKinney, TX (US)

(72) Inventors: Ruben Longoria, Little Elm, TX (US); Andrew Kislak Da Costa, Plano, TX (US); James Chester Hawkins, Allen, TX (US); David Oscar Mario Plummer, Irving, TX (US)

(73) Assignee: EMERSON PROCESS MANAGEMENT REGULATOR TECHNOLOGIES, INC, McKinney, TX (US)

( * ) Notice: Subject to any disclaimer, the term of this patent is extended or adjusted under 35 U.S.C. 154(b) by 91 days.

(21) Appl. No.: 18/618,729

(22) Filed: Mar. 27, 2024

(65) Prior Publication Data
US 2025/0305592 A1    Oct. 2, 2025

(51) Int. Cl.
*F16K 25/00* (2006.01)
*F02M 21/02* (2006.01)
*F16K 1/36* (2006.01)

(52) U.S. Cl.
CPC ......... *F16K 25/00* (2013.01); *F02M 21/0239* (2013.01); *F16K 1/36* (2013.01)

(58) Field of Classification Search
CPC .......... F16K 25/00; F16K 1/36; F16K 39/022; F02M 21/0239

USPC .......... 251/282; 137/116.5, 505.18
See application file for complete search history.

(56) References Cited

U.S. PATENT DOCUMENTS

| | | | |
|---|---|---|---|
| 3,009,678 | A | 11/1961 | Soderberg et al. |
| 3,601,360 | A | 8/1971 | Scaramucci |
| 3,812,882 | A | 5/1974 | Taylor |
| 4,172,585 | A | 10/1979 | Rolfe |
| 5,090,438 | A | 2/1992 | Nimberger |
| 5,709,369 | A | 1/1998 | Hawkins et al. |
| 8,123,195 | B2 | 2/2012 | Iwabuchi |
| 9,200,716 | B2 | 12/2015 | Mevius et al. |
| 9,310,811 | B2 | 4/2016 | Zhou |
| 9,574,672 | B2 | 2/2017 | Lin et al. |
| 9,639,093 | B2 | 5/2017 | Morgan |
| 10,072,761 | B2 | 9/2018 | Tuineag et al. |
| 11,092,244 | B1 | 8/2021 | Hu et al. |
| 11,339,878 | B2 | 5/2022 | Sonnier et al. |

(Continued)

*Primary Examiner* — Kelsey E Cary
(74) *Attorney, Agent, or Firm* — Hanley, Flight & Zimmerman, LLC (57) ABSTRACT

Pressure regulators with self-aligning valve disk assemblies are disclosed. An example pressure regulator disclosed herein includes a valve body defining a fluid passageway between an inlet and an outlet, a seat positioned in the fluid passageway, a stem movable relative to the seat, and a disk assembly coupled to the stem, the disk assembly including a disk holder defining a cavity, a retainer positioned in the cavity, the retainer including a first curved surface, and a disk positioned in the cavity and extending circumferentially around the first curved surface, a second curved surface of the disk complementary to the first curved surface such that the disk is pivotable and rotatable about the first curved surface to enable the disk to sealably engage the seat.

19 Claims, 7 Drawing Sheets

(56) References Cited

U.S. PATENT DOCUMENTS

| | | |
|---|---|---|
| 11,598,439 B1 | 3/2023 | Sonnier et al. |
| 2009/0272924 A1 | 11/2009 | Wingett et al. |
| 2014/0090719 A1* | 4/2014 | Mevius ............... F16K 1/42 |
| | | 137/505.18 |
| 2018/0031131 A1 | 2/2018 | Bregazzi et al. |
| 2021/0048020 A1* | 2/2021 | Johnson ............ F04B 53/1027 |

* cited by examiner

PRESSURE REGULATORS WITH SELF-ALIGNING VALVE DISK ASSEMBLIES

FIELD OF THE DISCLOSURE

This disclosure relates generally to process control devices and, more particularly, to pressure regulators with self-aligning valve disk assemblies.

BACKGROUND

Pressure regulators, sometimes referred to as fluid regulators, are commonly distributed throughout process control systems to control flow rates and/or pressures of various fluids (e.g., liquids, gases, etc.). Pressure regulators can be used to regulate the pressure of a fluid to a substantially constant value. For example, a pressure regulator typically has an inlet that receives a supply of process fluid at a relatively high pressure and reduces the pressure to a relatively lower and/or substantially constant pressure at an outlet.

SUMMARY

A first example pressure regulator disclosed herein includes a valve body defining a fluid passageway between an inlet and an outlet, a seat positioned in the fluid passageway, a stem movable relative to the seat, and a disk assembly coupled to the stem, the disk assembly including a disk holder defining a cavity, a retainer positioned in the cavity, the retainer including a first curved surface, and a disk positioned in the cavity and extending circumferentially around the first curved surface, a second curved surface of the disk complementary to the first curved surface such that the disk is pivotable and rotatable about the first curved surface to enable the disk to sealably engage the seat.

A second example pressure regulator disclosed herein includes a valve body defining a fluid passageway between an inlet and an outlet, a seat positioned in the fluid passageway, a stem movable relative to the seat, and a disk assembly coupled to the stem, the disk assembly including a disk holder defining a cavity, a disk cap positioned in the cavity, a first surface of the disk cap to engage a second surface of the disk holder such that the disk cap is pivotable and rotatable relative to the disk holder, and a disk positioned in the cavity and extending circumferentially around the disk cap, the disk to pivot with the disk cap to sealably engage the seat.

An example valve disk assembly disclosed herein includes a disk holder defining a cavity, a retainer positioned in the cavity, the retainer including a first curved surface, and a disk positioned in the cavity and extending circumferentially around the first curved surface, a second curved surface of the disk complementary to the first curved surface such that the disk is pivotable and rotatable about the first curved surface.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

In general, pressure regulators (e.g., fluid regulators) modulate, based on a sensed downstream pressure, flow of fluid through a system to maintain process system pressures within acceptable and/or constant pressure threshold(s). Typically, pressure regulators include a stem assembly having a disk assembly (e.g., a plug) coupled to a stem. The stem is moveable (e.g., relative to a regulator body) to move the disk assembly relative to a seat to control the flow of fluid through a fluid passageway defined between an inlet and an outlet of the pressure regulator. Further, pressure regulators commonly include a diaphragm operatively coupled to the stem assembly. The diaphragm separates a control chamber from a pressure sense chamber of the pressure regulator, where the pressure sense chamber is fluidly coupled to and receives fluid from a downstream location. The diaphragm moves (e.g., deflects) based on a difference between a first pressure in the pressure sense chamber (e.g., corresponding to a pressure of the fluid from the downstream location) and a second pressure in the control chamber (e.g., set via a spring). Additionally, the stem assembly is disposed between the pressure sense chamber and the fluid passageway. In some cases, movement of the diaphragm causes the stem assembly to move away from and/or toward the seat to allow and/or restrict the flow of fluid through the fluid passageway and, thus, to control the flow of fluid between the inlet and the outlet of the pressure regulator.

In some instances, manufacturing tolerances may result in one or more components of the pressure regulator being offset and/or otherwise misaligned (e.g., relative to other component(s) of the pressure regulator). For instance, a first longitudinal axis of the stem may be misaligned and/or offset from a second longitudinal axis of the seat. In some instances, as a result of the offset and/or misalignment, the disk assembly does not sealably engage the seat when the stem assembly is in a closed position (e.g., when the disk assembly contacts the seat to restrict fluid flow through the fluid passageway). Accordingly, some fluid may pass from the downstream location into a balance passage of the stem when the stem assembly is in the closed position, which may be undesirable for some applications. Further, misalignment between the disk assembly and an orifice of the seat may result in an undesirable build-up of pressure when the stem assembly is moved to the closed position. In some instances, because the disk assembly is rigidly coupled to the stem, the stem may tilt to compensate for the misalignment, which may result in damage to the stem and/or the regulator body. Additionally, as a result of such misalignment, increased force on the stem may be necessitated to press the disk assembly into the orifice in the closed position.

Disclosed herein are example pressure regulators with example valve disk assemblies (e.g., self-aligning valve disk assemblies) that address the drawbacks noted above. In particular, example valve disk assemblies disclosed herein enable pivoting and/or rotation of an example disk of the valve disk assembly (e.g., relative to an example disk holder of the valve disk assembly). As a result, examples disclosed herein enable the disk to sealably engage a seat of a pressure regulator by compensating for (e.g., reducing the effects of) possible misalignment between the seat and a stem rigidly coupled to the disk holder. Further, by enabling rotation and/or pivoting of the disk, examples disclosed herein reduce a possibility of damage (e.g., to the stem and/or to a regulator body of the pressure regulator) by reducing tilt of the stem and/or by reducing pressure build-up (e.g., lock up pressure) when the valve disk assembly engages the seat. Additionally, examples disclosed herein provide an example through-hole (e.g., a cavity) in the valve disk assembly to fluidly couple an orifice of the seat and an example balance passage of the stem. In some such examples, a portion of the through-hole defines an example hex feature (e.g., an angled surface) that can facilitate installation and/or removal of the valve disk assembly (and/or one or more parts thereof) to and/or from the stem. As a result, examples disclosed herein can improve servicing (e.g., repair and/or replacement) of the pressure regulator.

Figure 1:
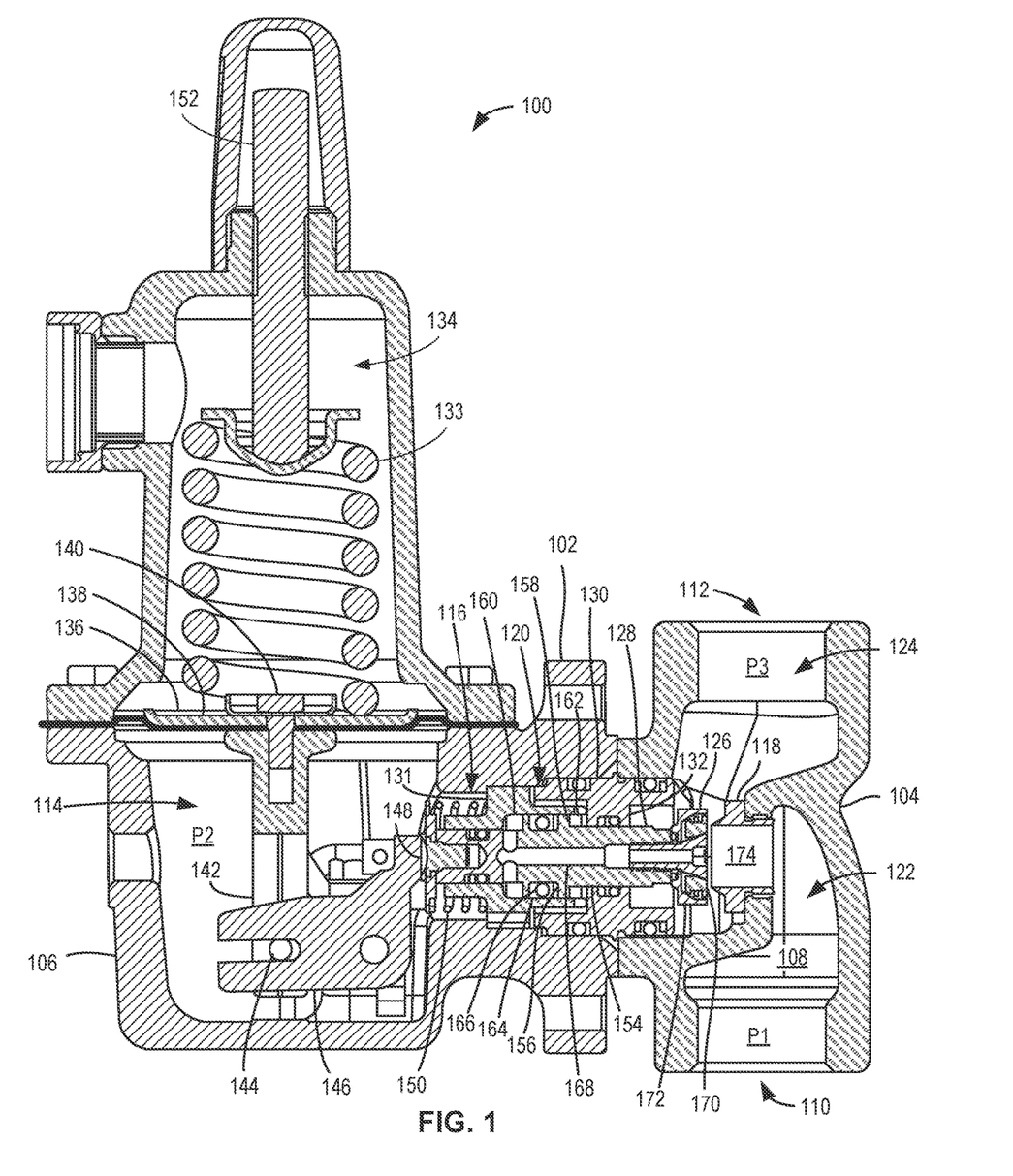
FIG. 1 is a cross-sectional view of an example pressure regulator having an example stem assembly with a first example valve disk assembly constructed in accordance with the teachings of this disclosure.

FIG. 1 is a cross-sectional view of an example pressure regulator 100 constructed in accordance with the teachings of this disclosure. In the illustrated example, the pressure regulator 100 includes an example device body 102 (e.g., a casing, a housing, etc.). In this example, the device body 102 includes an example regulator body 104 (sometimes referred to as a valve body or housing) and an example casing 106 that are coupled together (e.g., via one or more bolts). However, in other examples, the device body 102 can include more or fewer bodies or housings. In the illustrated example, the regulator body 104 of the device body 102 defines a fluid passageway 108 between an example inlet 110 and an example outlet 112. In some examples, an upstream pipe can be coupled to the regulator body 104 at the inlet 110 to provide fluid to the fluid passageway 108. In some examples, a downstream pipe can be coupled to the regulator body 104 at the outlet 112 to provide reduced pressure fluid to a downstream location. In the illustrated example, the casing 106 defines an example pressure sense chamber 114. Further, the device body 102 defines an example channel 116 (e.g., an opening, a bore, etc.) between the fluid passageway 108 and the pressure sense chamber 114.

In the illustrated example, the pressure regulator 100 includes an example seat 118 in the fluid passageway 108. The pressure regulator 100 also includes an example stem assembly 120. The stem assembly 120 controls the flow of fluid through the seat 118 and, thus, between the inlet 110 and the outlet 112. The seat 118 divides the fluid passageway 108 into an upstream portion 122 (upstream of the seat 118) and a downstream portion 124 (downstream of the seat 118).

In the illustrated example, the stem assembly 120 includes a first example disk assembly (e.g., a first valve disk assembly, a first self-aligning disk assembly, a first plug assembly) 126 constructed in accordance with teachings of this disclosure. In this example, the stem assembly 120 further includes an example stem 128 and an example stem guide 130, where the first valve disk assembly 126 is coupled (e.g., rigidly coupled) to the stem 128. The stem 128 is moveable (e.g., slidable) relative to the stem guide 130 to move the first valve disk assembly 126 toward or away from the seat 118, thereby controlling the flow of fluid through the seat 118. The first valve disk assembly 126 can be moved between an open position (shown in FIG. 1) and a closed position. In the open position, as shown in FIG. 1, the first valve disk assembly 126 is spaced from the seat 118, which allows fluid to flow from the inlet 110 to the outlet 112. In the closed position, the first valve disk assembly 126 is sealably engaged with the seat 118, which prevents and/or restricts fluid flow from the inlet 110 to the outlet 112. Therefore, the seat 118 and the first valve disk assembly 126 form a valve. In some examples, the pressure regulator 100 can move the first valve disk assembly 126 between the open and closed positions to regulate the pressure of the fluid downstream.

In the illustrated example of FIG. 1, the stem guide 130 is disposed in the channel 116 between the pressure sense chamber 114 and the fluid passageway 108. The stem guide 130 is sealed relative to the device body 102 to fluidly isolate the fluid in the fluid passageway 108 and fluid in the pressure sense chamber 114. The stem guide 130 has a first side 131 and a second side 132 opposite the first side 131. The first side 131 faces the pressure sense chamber 114 and is exposed to the pressure sense chamber 114. The second side 132 faces the fluid passageway 108 and is exposed to the fluid passageway 108.

In the example of FIG. 1, the casing 106 includes an example control spring 133. The control spring 133 is used to control or set the pressure at which the pressure regulator 100 opens and closes. The control spring 133 is disposed in an example control chamber 134 in the casing 106. In some examples, the control chamber 134 is open to the atmosphere. In other examples, the control chamber 134 may be pressurized with a fluid. In the illustrated example, the pressure regulator 100 includes an example diaphragm 136 that separates the control chamber 134 and the pressure sense chamber 114. The pressure regulator 100 further includes an example diaphragm plate 138 that is coupled to the diaphragm 136 via an example diaphragm cap screw 140. In the illustrated example, the control spring 133 is engaged with the diaphragm plate 138, which biases the diaphragm plate 138 and the diaphragm 136 toward the pressure sense chamber 114 (downward in FIG. 1). The diaphragm plate 138 is coupled to an example pusher post 142 (e.g., via the diaphragm cap screw 140). The pusher post 142 includes an example drive pin 144 that cooperates with an example lever 146. The lever 146 is pivotably coupled to the casing 106. The lever 146 is coupled to an example stem pin 148 that is coupled to the stem 128. As the pusher post 142 moves up and down, the pusher post 142 rotates the lever 146, which moves the stem 128 linearly in the stem guide 130 (left and right in FIG. 1).

The pressure regulator 100 receives, at the inlet 110, fluid at a first example pressure (e.g., P1). In some examples, the pressure regulator 100 restricts and/or reduces flow of the fluid to the outlet 112 based on a pressure of fluid at a downstream location, where the fluid at the downstream location is at a second example pressure (e.g., P2). For example, when the second pressure meets or exceeds a threshold pressure (e.g., a set pressure, a trigger pressure), the pressure regulator 100 closes the fluid passageway 108 to regulate the pressure of the fluid at the downstream location. In the illustrated example, the downstream location is fluidly coupled to the pressure sense chamber 114, such that the pressure sense chamber 114 is at the second pressure. In this example, the pressure regulator 100 is an external sense pressure regulator, where the pressure sense chamber 114 is referenced to an external pressure. In such examples, the pressure at the downstream location is fluidly coupled to the pressure sense chamber 114 via a fluid line (e.g., a hose, a pipe, a tube, etc.). In some examples, the pressure regulator 100 is an internal sense pressure regulator, where the pressure sense chamber 114 is referenced to the pressure of the fluid in the downstream portion 124. In such examples, the pressure regulator 100 can include one or more passages to fluidly couple the downstream portion 124 of the fluid passageway 108 and the pressure sense chamber 114.

When the second pressure in the pressure sense chamber 114 satisfies (e.g., is at or above) the threshold pressure, the second pressure overcomes the spring force of the control spring 133 and forces the diaphragm 136 upward in FIG. 1. As the diaphragm 136 and the diaphragm plate 138 move upward, the pusher post 142 rotates the lever 146 in a first direction (e.g., clockwise in FIG. 1). The lever 146 pushes the stem 128 to the right in FIG. 1, until the first valve disk assembly 126 engages the seat 118 to close and/or seal off the fluid passageway 108 and, thus, reduce the pressure of the fluid at the downstream location. When the second pressure of the fluid in the pressure sense chamber 114 does not satisfy (e.g., is less than) the threshold pressure, the spring force of the control spring 133 overcomes the second pressure and moves the diaphragm 136 and the diaphragm plate 138 downward in FIG. 1. As a result, the pusher post 142 moves downward in FIG. 1 and rotates the lever 146 in a second direction (e.g., counterclockwise in FIG. 1). In some examples, the pressure regulator 100 includes a return spring 150 to bias the stem 128 back to the left in FIG. 1, such that the first valve disk assembly 126 moves away from the seat 118. Thus, the threshold pressure is based (at least partially) on the spring force from the control spring 133. In some examples, the spring force can be increased or decreased to change the threshold pressure to a desired pressure level. For example, an adjustment screw 152 can be adjusted to increase or decrease the compression of the control spring 133 and, thus, change the force the control spring 133 exerts on the diaphragm 136.

In the illustrated example, the pressure of the fluid in the downstream portion 124 of the fluid passageway 108 is at a third example pressure (e.g., P3). In some examples, such as when the first valve disk assembly 126 is throttling (e.g., actively moving between the open and closed positions), the third pressure may be substantially lower than the first pressure. In other examples, such as when the first valve disk assembly 126 is held in the open position for a period of time, the third pressure may be the same (or substantially the same) as the first pressure (e.g., there may be a relatively small pressure drop across the seat 118). In some examples, the second pressure is substantially the same as the third pressure. However, in other examples, the second pressure can be different from the third pressure.

Because the pressures (e.g., P1, P2, and P3) may be different, the example pressure regulator 100 balances the stem 128 to reduce and/or eliminate the effect of the pressure differential on the stem 128 and the first valve disk assembly 126. In the illustrated example, the stem 128 has an example stem body 154 and an example flange 156 extending radially from the stem body 154. Further, the stem guide 130 defines an example balance chamber 158. The stem 128 extends through the stem guide 130, such that the flange 156 is disposed in the balance chamber 158. In this example, the flange 156 divides the balance chamber 158 into a first balance chamber portion 160 and a second balance chamber portion 162. In particular, the flange 156 fluidly separates the first and second balance chamber portions 160, 162. In the illustrated example, the flange 156 defines an example seal gland 164. The pressure regulator 100 further includes a seal 166 positioned in the seal gland 164 and engaged with an inner surface of the stem guide 130 forming the balance chamber 158. In some examples, the seal 166 fluidly isolates the first and second balance chamber portions 160, 162.

In the illustrated example, an example balance passage (e.g., a balance port, a pressure registration port) 168 is defined through the first valve disk assembly 126 and through a portion of the stem 128 that extends to the first balance chamber portion 160. In particular, a portion of the balance passage 168 extends longitudinally through the stem 128, and another portion of the balance passage 168 extends in a transverse direction (e.g., upward or downward in FIG. 1) to an outer surface of the stem 128. As such, when the first valve disk assembly 126 is in the open position, as shown in FIG. 1, the balance passage 168 fluidly couples the downstream portion 124 of the fluid passageway 108 and the first balance chamber portion 160. Therefore, the fluid in the first balance chamber portion 160 is at the third pressure (which may be the same as or similar to the first pressure) when the first valve disk assembly 126 is in the open position. Conversely, when the first valve disk assembly 126 is in the closed position, the balance passage 168 fluidly couples the upstream portion 122 of the fluid passageway 108 and the first balance chamber portion 160. As a result, the fluid in the first balance chamber portion 160 is at the first pressure when the first valve disk assembly 126 is in the closed position. In some examples, the balance passage 168 can be formed by one or more openings or channels through one or more other structures.

In some examples, one or more components of the pressure regulator 100 (e.g., the stem 128 and the seat 118, the first valve disk assembly 126 and the seat 118, etc.) may be misaligned and/or offset from one another as a result of manufacturing tolerances, wear of one or more component (s), etc. In the illustrated example of FIG. 1, the first valve disk assembly 126 includes an example disk 170 that is pivotable and/or rotatable within an example disk holder 172 of the first valve disk assembly 126. In some examples, the disk 170 can pivot as a result of contact with the seat 118 when the first valve disk assembly 126 moves to the closed position. For example, the disk 170 can pivot to account for misalignment between the seat 118 and the first valve disk assembly 126 and/or the stem 128. As a result, the disk 170 can sealably engage the seat 118 and, thus, seal off an orifice 174 of the seat 118 from the downstream portion 124 of the fluid passageway 108.

Figure 2:
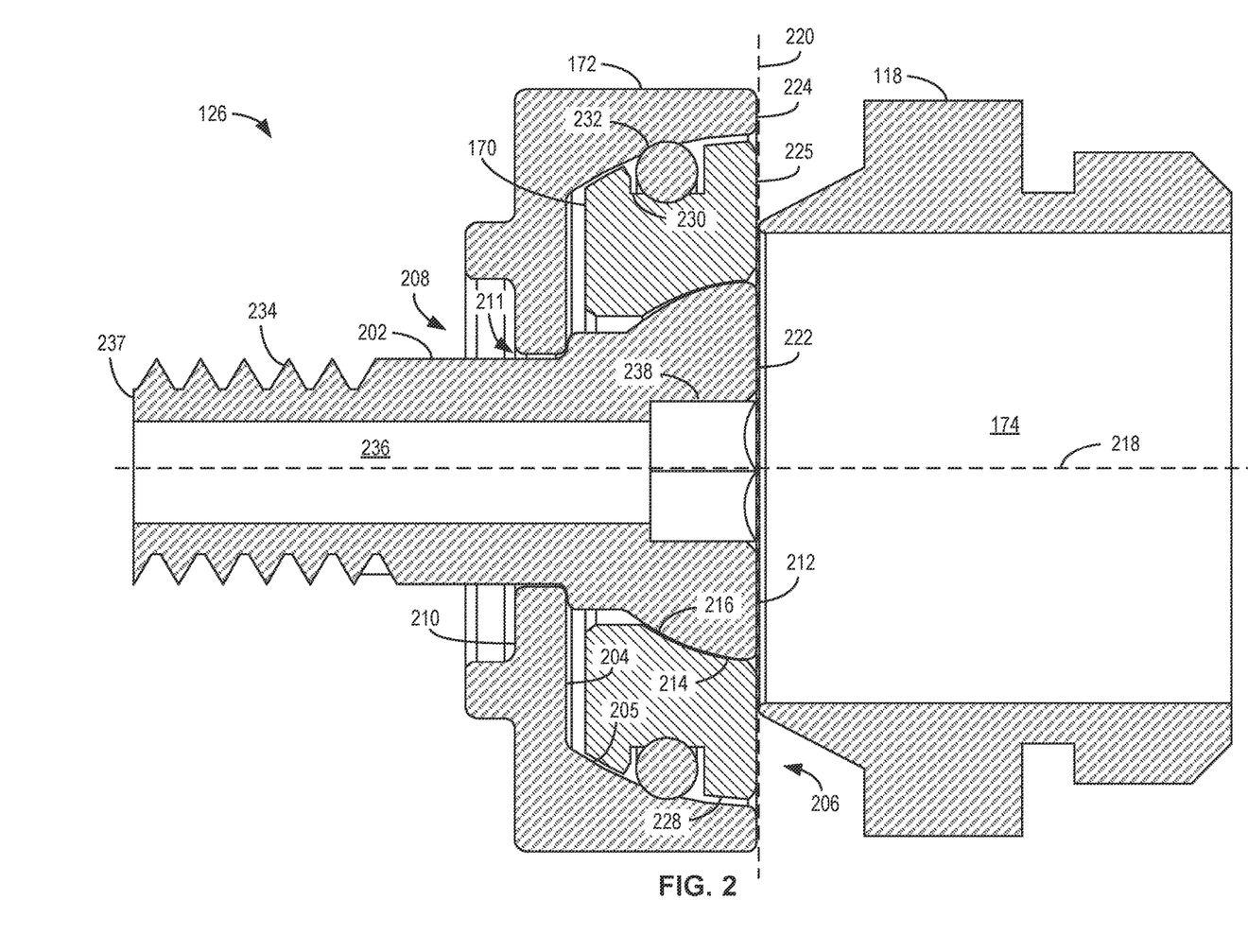
FIG. 2 is a cross-sectional view of the first example valve disk assembly of FIG. 1.

FIG. 2 is a cross-sectional view of the first example valve disk assembly 126 of FIG. 1. In the illustrated example of FIG. 2, the first valve disk assembly 126 is shown in a closed position in which the disk 170 is sealably engaged to the seat 118. The first valve disk assembly 126 of FIG. 2 includes the disk holder 172, the disk 170, and an example retainer 202. In this example, an inner surface 204 and an inner sidewall (e.g., a curved inner sidewall) 205 of the disk holder 172 define an example cavity 206 in which the disk 170 is positioned and/or disposed. Further, the disk holder 172 includes an aperture 208 extending between the inner surface 204 and an outer surface 210 of the disk holder 172. In this example, the retainer 202 is positioned in the aperture 208. In some examples, a cross-sectional diameter of the retainer 202 is smaller than a cross-sectional diameter of the aperture 208, such that there is a gap 211 between the retainer 202 and the disk holder 172 (e.g., the retainer 202 and the disk holder 172 are separate). While the retainer 202 and the disk holder 172 are separate in this example, the retainer 202 can be integral to the disk holder 172 in some examples (e.g., there is no gap 211 between the retainer 202 and the disk holder 172), such that the retainer 202 and the disk holder 172 form a unitary (e.g., single) part.

In the illustrated example of FIG. 2, the retainer 202 includes an example head (e.g., a retaining head) 212 extending into and/or positioned in the cavity 206. The head 212 includes a first curved surface (e.g., a convex surface) 214 that is complementary to a second curved surface (e.g., a concave surface) 216 of the disk 170. In this example, the disk 170 surrounds and/or extends circumferentially around the head 212 (e.g., a portion of the head 212 that includes the first curved surface 214). In such examples, the second curved surface 216 of the disk 170 is operatively coupled to the first curved surface 214 of the head 212, such that the disk 170 and the head 212 form a partial ball joint. As a result, the disk 170 is pivotable and/or rotatable about the head 212. For example, the disk 170 can rotate relative to the head 212 and/or the disk holder 172 about an example longitudinal axis 218 of the head 212 and/or the disk holder 172. Additionally, the disk 170 can pivot about the head 212 relative to an example pivot plane 220. In this example, the pivot plane 220 passes through a geometric center of a sphere defined by the first curved surface 214 of the head 212. In some examples, the pivot plane 220 corresponds to a first surface 222 of the head 212, a second surface 224 of the disk holder 172, and/or a third surface 225 of the disk 170. In this example, the first surface 222, the second surface 224, and the third surface 225 of the disk 170 are substantially flat (e.g., not curved), and the first surface 222 is substantially flush with the second surface 224 and the third surface 225. In some examples, the first surface 222, the second surface 224, and/or the third surface 225 can have a different shape (e.g., can be curved) and/or can be offset from one another (e.g., the first surface 222 can extend further along the longitudinal axis 218 compared to the second surface 224 and/or the third surface 225, the second surface 224 can extend further along the longitudinal axis 218 compared to the first surface 222 and/or the third surface 225, etc.).

In the illustrated example of FIG. 2, the disk 170 includes a third curved surface (e.g., a curved outer surface) 228 that is complementary to the inner sidewall 205 of the disk holder 172. In some examples, the third curved surface 228 is spaced apart from (e.g., does not contact) the inner sidewall 205, such that the inner sidewall 205 does not interfere with rotation and/or pivoting of the disk 170. While the third curved surface 228 and the inner sidewall 205 are curved in this example, the third curved surface 228 and/or the inner sidewall 205 can have a different shape in some examples. For example, one or more portions of the third curved surface 228 and/or the inner sidewall 205 can be substantially flat (e.g., not curved).

In the illustrated example of FIG. 2, the third curved surface 228 of the disk 170 defines an example groove 230 in the disk 170, where the groove 230 extends circumferentially about the disk 170. In this example, a cross-sectional shape of the groove 230 is rectangular. In some examples, the cross-sectional shape of the groove 230 may be different. In some examples, an example O-ring (e.g., a seal) 232 is positioned in the groove 230, such that the O-ring 232 extends circumferentially about the disk 170. In this example, the O-ring 232 has a substantially circular cross-sectional shape. In some examples, the cross-sectional shape may be different (e.g., elliptical, rectangular, etc.). In some examples, the O-ring 232 provides a seal between the disk 170 and the disk holder 172. In particular, the O-ring 232 provides a seal between the inner sidewall 205 of the disk holder 172 and the third curved surface 228 of the disk 170. As a result, the O-ring 232 prevents and/or restricts flow of fluid between an outer surface of the seat 118 (e.g., from the downstream portion 124 of the fluid passageway 108 of FIG. 1) and the orifice 174 of the seat 118 when the first valve disk assembly 126 is in the closed position of FIG. 2.

In the illustrated example of FIG. 2, the retainer 202 includes an example threaded portion 234 extending from the outer surface 210 of the disk holder 172. In some examples, the threaded portion 234 can be inserted into a corresponding threaded opening of the stem 128 of FIG. 1 to couple (e.g., removably couple) the first valve disk assembly 126 to the stem 128. Further, in the example of FIG. 2, the retainer 202 includes an example through-hole 236 extending longitudinally through the retainer 202 between the first surface 222 and a fourth surface 237 of the retainer 202. In some examples, the through-hole 236 forms and/or defines a portion of the balance passage 168 of the stem 128 of FIG. 1. For example, when the first valve disk assembly 126 is in the closed position of FIG. 2, fluid from the orifice 174 can enter the through-hole 236 and, thus, the balance passage 168 to flow to the first balance chamber portion 160 of FIG. 1.

In the example of FIG. 2, a portion of the through-hole 236 includes an example hex feature (e.g., an angled surface) 238 proximate the first surface 222 of the retainer 202. In some examples, the hex feature 238 can be used to facilitate installation and/or removal of the first valve disk assembly 126 to and/or from the stem 128 of FIG. 1. For example, a tool (e.g., a hand tool and/or a powered tool) corresponding to the hex feature 238 can be inserted into the hex feature 238, such that rotation of the tool causes corresponding rotation of the retainer 202 and/or the first valve disk assembly 126 about the longitudinal axis 218. In some such examples, the rotation of the retainer 202 about the longitudinal axis 218 causes the threaded portion 234 of the retainer 202 to be threaded into and/or unthreaded from the stem 128 of FIG. 1. In some examples, unthreading of the threaded portion 234 from the stem 128 can result in the retainer 202 being removed from both the stem 128 and the disk holder 172. In some examples, unthreading of the threaded portion 234 from the stem 128 results in removal of the disk holder 172 with the stem 128. In some examples, by facilitating installation and/or removal of the retainer 202 and/or the first valve disk assembly 126, the hex feature 238 facilitates repair, replacement, and/or other maintenance activities associated with the first valve disk assembly 126 and/or the pressure regulator 100 of FIG. 1. In the illustrated example of FIG. 2, the hex feature 238 corresponds to a recess having a hexagonal shape. In some examples, additionally or alternatively, the retainer 202 can include one or more different angled surfaces and/or recesses in the first surface 222 and/or in the through-hole 236 to facilitate installation and/or removal of the retainer 202 and/or the first valve disk assembly 126.

Figure 3:
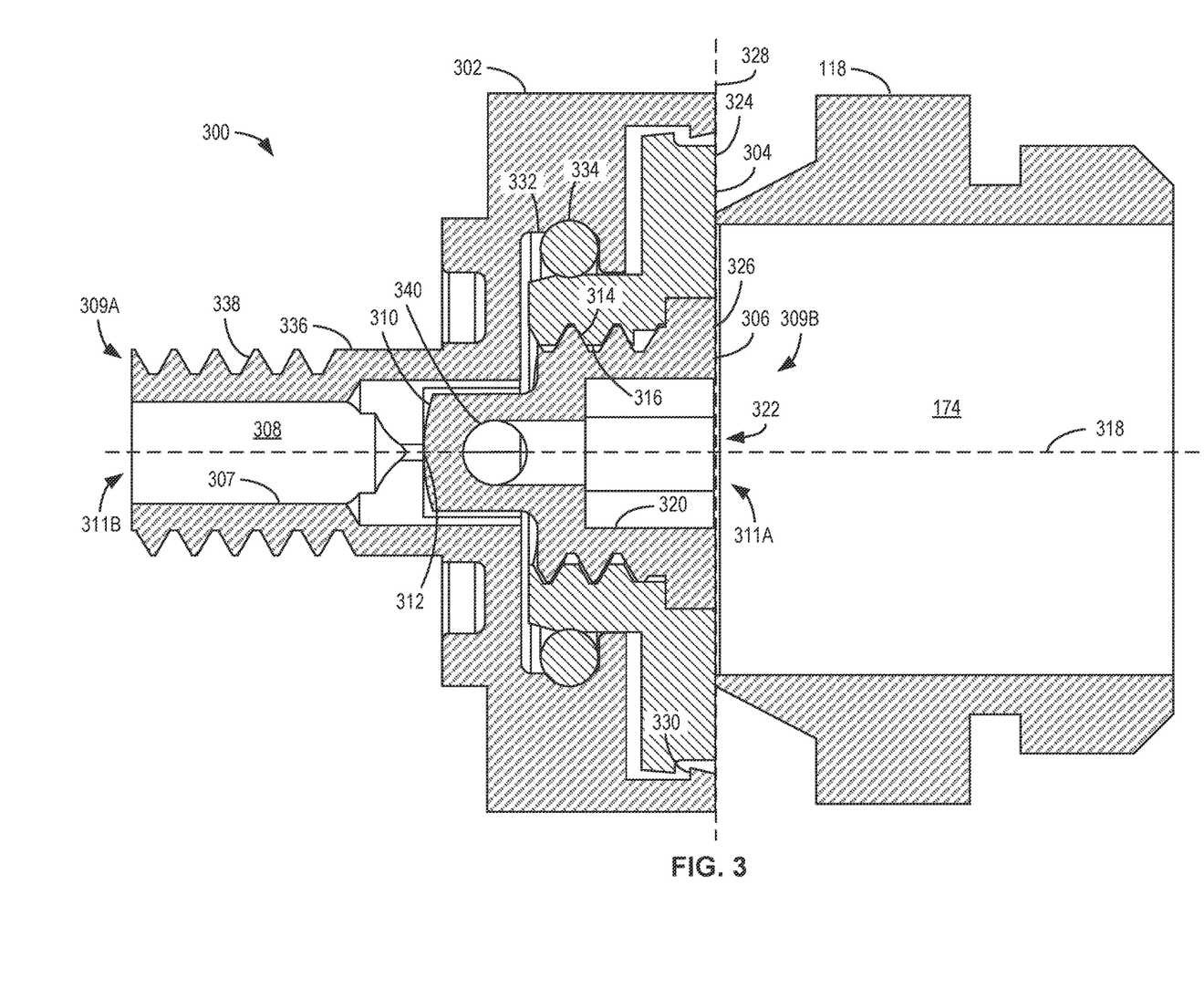
FIG. 3 is a cross-sectional view of a second example valve disk assembly that may be implemented in the example pressure regulator of FIG. 1.

FIG. 3 is a cross-sectional view of a second example valve disk assembly 300 that may be implemented in the example pressure regulator 100 of FIG. 1. For example, the second valve disk assembly 300 may be used in the pressure regulator 100 instead of the first valve disk assembly 126 of FIGS. 1 and/or 2. In the illustrated example of FIG. 3, the second valve disk assembly 300 includes an example disk holder 302, an example disk 304 positioned in the disk holder 302, and an example disk cap (e.g., a threaded disk cap) 306 coupled (e.g., removably coupled) to the disk 304. In this example, an inner surface 307 of the disk holder 302 defines an example cavity (e.g., a through-hole) 308 extending between a first end 309A and a second end 309B of the second valve disk assembly 300. In this example, the disk 304 and the disk cap 306 are positioned and/or disposed in a first portion (e.g., an inlet portion) 311A of the cavity 308 proximate the second end 309B of the second valve disk assembly 300.

The disk cap 306 includes a first example surface (e.g., a curved surface, a convex surface) 310 that engages (e.g., contacts) a second example surface (e.g., an inner surface) 312 of the disk holder 302. In this example, the first surface 310 of the disk cap 306 is curved (e.g., convex), and the second surface 312 of the disk holder 302 is substantially flat (e.g., not curved). As a result, the first surface 310 and, thus, the disk cap 306 can pivot and/or rotate relative to the second surface 312 and, thus, the disk holder 302. In some examples, the first surface 310 can be substantially flat and the second surface 312 can be curved to enable pivoting and/or rotation of the disk cap 306 relative to the disk holder 302. In some examples, both of the first surface 310 and the second surface 312 can be curved (e.g., the first surface 310 is a convex surface and the second surface 312 is a concave surface, the first surface 310 is a concave surface and the second surface 312 is a convex surface, etc.), where a first curve of the first surface 310 is complementary to a second curve of the second surface 312 such that the disk cap 306 is pivotable and/or rotatable relative to the disk holder 302.

In the illustrated example of FIG. 3, the disk cap 306 includes a threaded outer surface 314, and the disk 304 includes an example threaded inner surface 316 that is complementary to the threaded outer surface 314. In some examples, the disk cap 306 is removably coupled to the disk 304 by rotation of the disk cap 306 about an example longitudinal axis 318 of the disk 304 and/or the disk cap 306. In this example, an inner surface 320 of the disk cap 306 defines a first example hex feature 322 of the disk cap 306, where the first hex feature 322 can be used to facilitate coupling and/or removal of the disk cap 306 to and/or from the disk 304. For example, a tool (e.g., a hand tool and/or a powered tool) having a shape complementary to the first hex feature 322 can be inserted into the first hex feature 322, such that rotation of the tool causes corresponding rotation of the disk cap 306 about the longitudinal axis 318. In some such examples, the rotation of the disk cap 306 about the longitudinal axis 318 causes the threaded outer surface 314 of the disk cap 306 to move (e.g., translate) relative to the threaded inner surface 316 of the disk 304, such that the disk cap 306 can be threaded into and/or unthreaded from the disk 304. In some examples, unthreading of the disk cap 306 from the disk 304 can result in the disk cap 306 being removed from the disk 304 and/or the disk holder 302 to facilitate maintenance (e.g., repair and/or replacement) of one or more components of the second valve disk assembly 300 and/or the pressure regulator 100 of FIG. 1. In the illustrated example of FIG. 3, the first hex feature 322 corresponds to a recess having a hexagonal shape. In some examples, a shape of the first hex feature 322 can be different. For example, the disk cap 306 can include one or more different angled surfaces and/or recesses to facilitate installation and/or removal of the disk cap 306 to and/or from the disk 304.

In the illustrated example of FIG. 3, when the disk cap 306 is coupled to (e.g., threaded into) the disk 304, the disk 304 can pivot and/or rotate with the disk cap 306 relative to the disk holder 302. For example, the disk 304 and/or the disk cap 306 can rotate relative to the disk holder 302 about the longitudinal axis 318. Additionally, the disk 304 and/or the disk cap 306 can pivot relative to the disk holder 302. For example, a third example surface 324 of the disk 304 and/or a fourth example surface 326 of the disk cap 306 can pivot relative to an example pivot plane 328. In some examples, when the second valve disk assembly 300 moves to a closed position (e.g., in which the disk 304 contacts the seat 118), the seat 118 can apply a force on a third example surface 324 of the disk 304 to cause the disk 304 and/or the disk cap 306 to pivot and/or rotate within the disk holder 302. In some such examples, the pivoting and/or rotation of the disk 304 can compensate for possible misalignment between the second valve disk assembly 300 and the seat 118, thus enabling the disk 304 to sealably engage the seat 118 in the closed position.

In this example, the third surface 324 of the disk 304 and the fourth surface 326 of the disk cap 306 are substantially flat (e.g., not curved), and the third surface 324 is substantially flush with the fourth surface 326. In some examples, the third surface 324 and/or the fourth surface 326 can have a different shape (e.g., can be curved) and/or can be offset from one another (e.g., the third surface 324 can extend further along the longitudinal axis 318 compared to the fourth surface 326, the fourth surface 326 can extend further along the longitudinal axis 318 compared to the third surface 324, etc.).

In the illustrated example of FIG. 3, the inner surface 307 of the disk holder 302 defines an example tab (e.g., a retaining tab) 330 that extends into the cavity 308 and can be used to retain (e.g., prevent removal of) the disk 304 in the cavity 308. Further, the inner surface 307 of the disk holder 302 defines an example recess 332 that extends circumferentially about the disk 304 and/or the disk cap 306. In this example, a cross-sectional shape of the recess 332 is rectangular. In some examples, the cross-sectional shape of the recess 332 may be different (e.g., rounded). In some examples, an example O-ring (e.g., a seal) 334 is positioned in the recess 332, such that the O-ring 334 extends circumferentially about the disk 304 and/or the disk cap 306. In this example, the O-ring 334 has a substantially circular cross-sectional shape. In some examples, the cross-sectional shape of the O-ring 334 may be different (e.g., elliptical, rectangular, etc.).

In the illustrated example of FIG. 3, an outer surface 336 of the disk holder 302 defines an example threaded portion 338 proximate the first end 309A of the disk holder 302. In some examples, the threaded portion 338 can be inserted into a corresponding threaded opening of the stem 128 of FIG. 1 to couple (e.g., removably couple) the second valve disk assembly 300 to the stem 128. In such examples, the cavity 308 forms and/or defines a portion of the balance passage 168 of the stem 128 of FIG. 1. In some examples, when the second valve disk assembly 300 is in the closed position of FIG. 3, fluid from the orifice 174 of the seat 118 can enter the cavity 308 via the first hex feature 322 of the disk cap 306. Further, the first hex feature 322 is fluidly coupled to an example opening 340 of the disk cap 306, where the opening 340 extends into and/or out of the page in FIG. 3. In this example, the first hex feature 322 extends along a first direction (e.g., a longitudinal direction) in the disk cap 306, and the opening 340 extends through the disk cap 306 along a second direction (e.g., a transverse direction) perpendicular to the first direction. In some examples, fluid from the first hex feature 322 can flow via the opening 340 toward a second portion (e.g., an outlet portion) 311B of the cavity 308 (e.g., proximate the first end 309A of the second valve disk assembly 300). As a result, the fluid can flow through the cavity 308 and, thus, through the balance passage 168 of the stem 128 and toward the first balance chamber portion 160 of FIG. 1.

In some examples, the O-ring 334 provides a seal between the disk 304 and the disk holder 302. In particular, the O-ring 344 provides a seal between the inner surface 307 of the disk holder 302 (e.g., a portion of the inner surface 307 defining the recess 332) and the disk 304 while enabling the disk 304 and/or the disk cap 306 to pivot relative to the disk holder 302. As a result, when the second valve disk assembly 300 is in the closed position of FIG. 3, the O-ring 334 prevents and/or restricts fluid flow to an outer surface of the seat 118 (e.g., to the downstream portion 124 of the fluid passageway 108 of FIG. 1) from the outlet portion 311B of the cavity 308 and, thus, from the first balance chamber portion 160 via the balance passage 168 of FIG. 1.

Figure 4A:
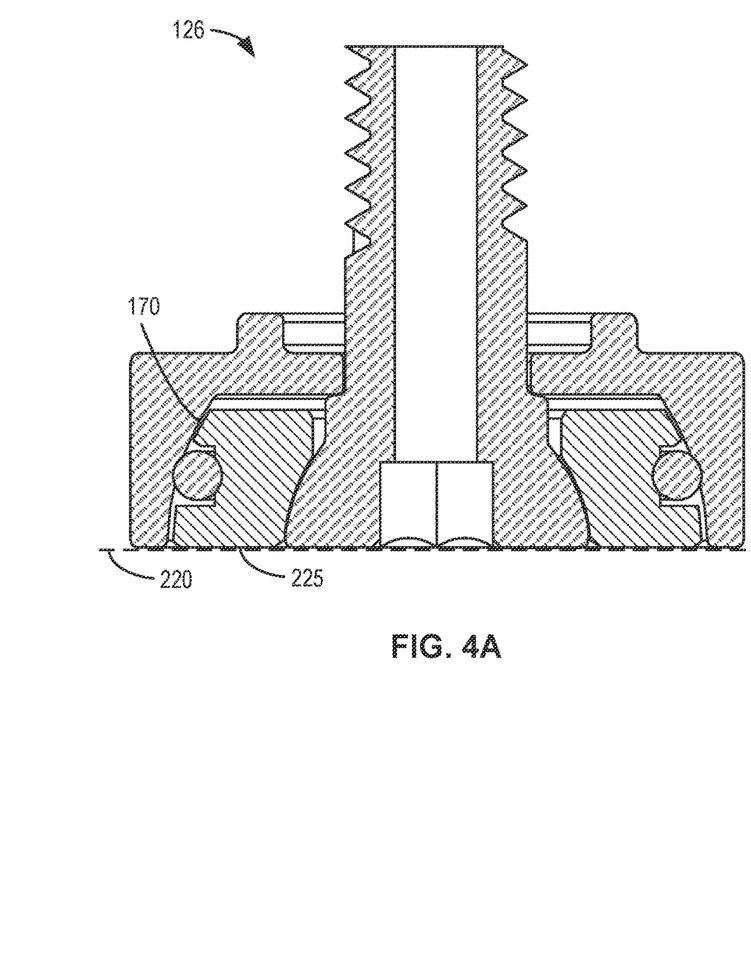
FIG. 4A is a cross-sectional view of the first example valve disk assembly of FIGS. 1 and/or 2 in an undeflected position.
Figure 4B:
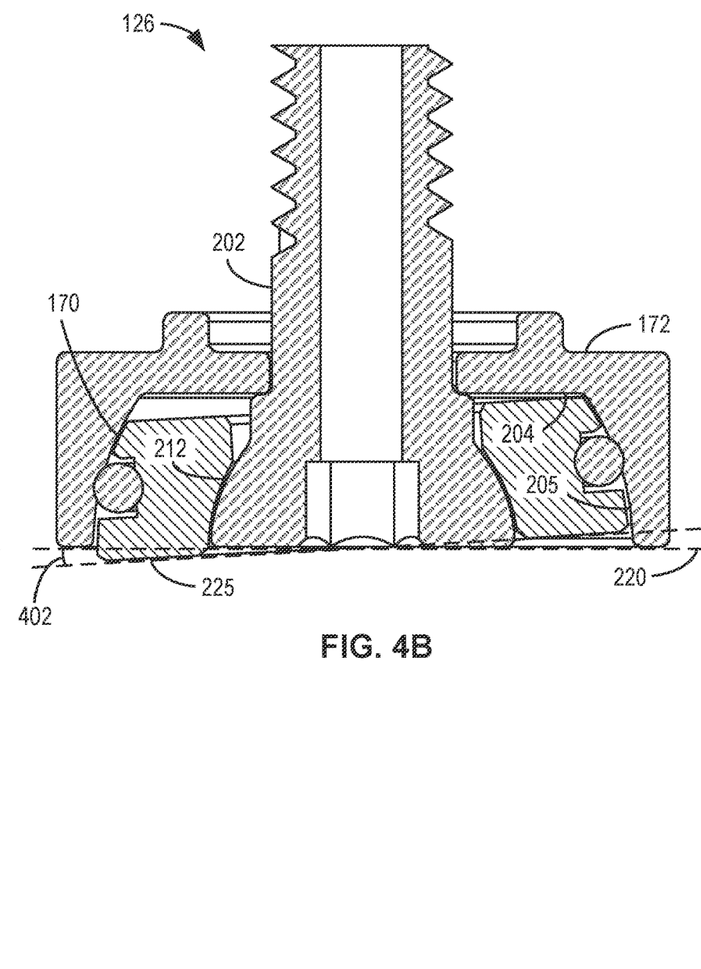
FIG. 4B is a cross-sectional view of the first example valve disk assembly of FIGS. 1, 2, and/or 4A in a deflected position.

FIGS. 4A and 4B illustrate the first example valve disk assembly 126 of FIGS. 1 and/or 2 in an undeflected position (e.g., a neutral position) and an undeflected position (e.g., a pivoted position), respectively. In the illustrated example of FIG. 4A, when the first valve disk assembly 126 is in the undeflected position, the third surface 225 of the disk 170 is parallel to the pivot plane 220 of the first valve disk assembly 126. Conversely, when the first valve disk assembly 126 is in the deflected position of FIG. 4B, the third surface 225 of the disk 170 is angled (e.g., at an angular offset) relative to the pivot plane 220. For example, in FIG. 4B, the third surface 225 is angled from the pivot plane 220 by a first example pivot angle 402.

In some examples, the disk 170 can pivot about the head 212 of the retainer 202 up to a first example threshold angle from the pivot plane 220 (e.g., the first pivot angle 402 can be less than or equal to the first threshold angle). For example, when the disk 170 pivots from the pivot plane 220 by the first threshold angle, the disk holder 172 (e.g., the inner surface 204 and/or the inner sidewall 205 of the disk holder 172) contacts the disk 170 to prevent and/or restrict further pivoting of the disk 170. In this example, the first threshold angle is approximately 2 degrees. In some examples, the first threshold angle can be different (e.g., 1 degree, 1.5 degrees, 3 degrees, etc.). In some examples, the first threshold angle can be adjusted by adjusting (e.g., increasing or decreasing) a spacing (e.g., a gap) between the disk 170 and the inner surface 204 and/or the inner sidewall 205.

Figure 5A:
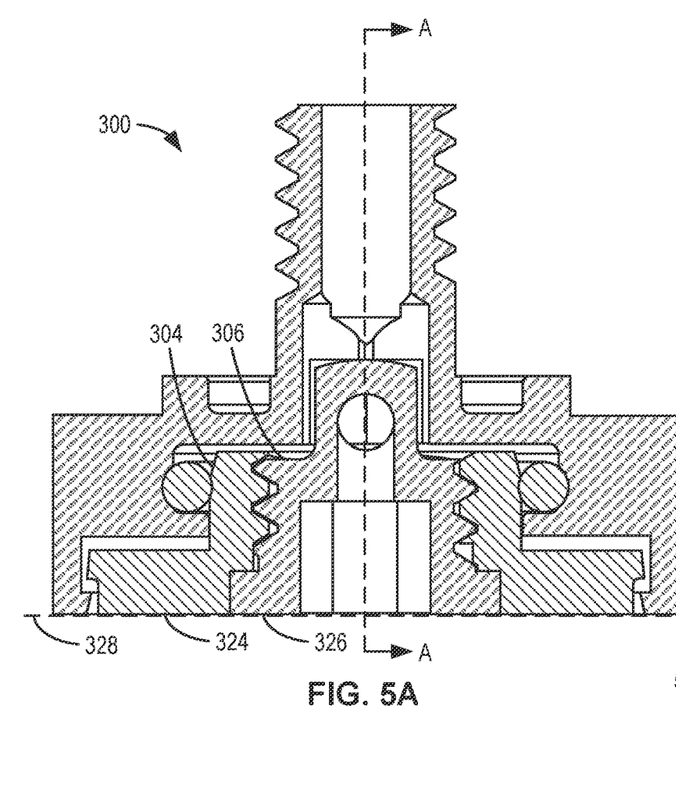
FIG. 5A is a cross-sectional view of the second example valve disk assembly of FIG. 3 in an undeflected position.
Figure 5B:
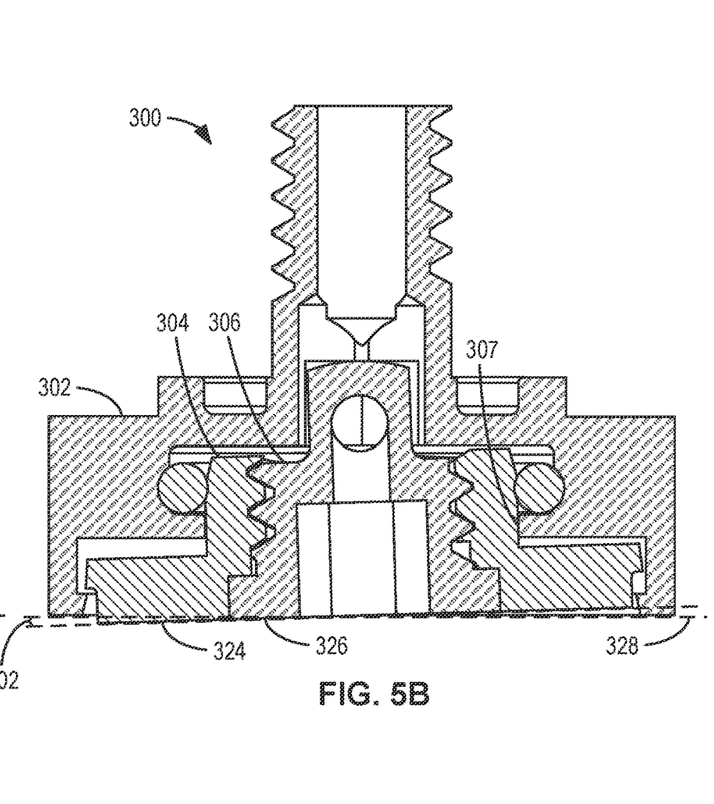
FIG. 5B is a cross-sectional view of the second example valve disk assembly of FIGS. 3 and/or 5A in a deflected position.

FIGS. 5A and 5B illustrate the second example valve disk assembly 300 of FIG. 3 in an undeflected position (e.g., a neutral position) and an undeflected position (e.g., a pivoted position), respectively. In the illustrated example of FIG. 5A, when the second valve disk assembly 300 is in the undeflected position, the third surface 324 of the disk 304 and/or the fourth surface 326 of the disk cap 306 are parallel to the pivot plane 328 of the second valve disk assembly 300. Conversely, when the second valve disk assembly 300 is in the deflected position of FIG. 5B, the third surface 324 of the disk 304 and/or the fourth surface 326 of the disk cap 306 are angled (e.g., at an angular offset) relative to the pivot plane 328. For example, in FIG. 5B, the third surface 324 and/or the fourth surface 326 are angled from the pivot plane 328 by a second example pivot angle 502.

In some examples, the disk 304 and/or the disk cap 306 can pivot relative to the disk holder 302 up to a second example threshold angle from the pivot plane 328 (e.g., the second pivot angle 502 can be less than or equal to the second threshold angle). For example, when the disk 304 and/or the disk cap 306 pivot from the pivot plane 328 by the second threshold angle, the inner surface 307 of the disk holder 302 contacts at least one of the disk 304 or the disk cap 306 to prevent and/or restrict further pivoting of the disk 304 and/or the disk cap 306. In this example, the second threshold angle is approximately 2 degrees. In some examples, the second threshold angle can be different (e.g., 1 degree, 1.5 degrees, 3 degrees, etc.). In some examples, the second threshold angle can be adjusted by adjusting (e.g., increasing or decreasing) a spacing (e.g., a gap) between the inner surface 307 of the disk holder 302 and at least one of the disk 304 or the disk cap 306.

Figure 6:
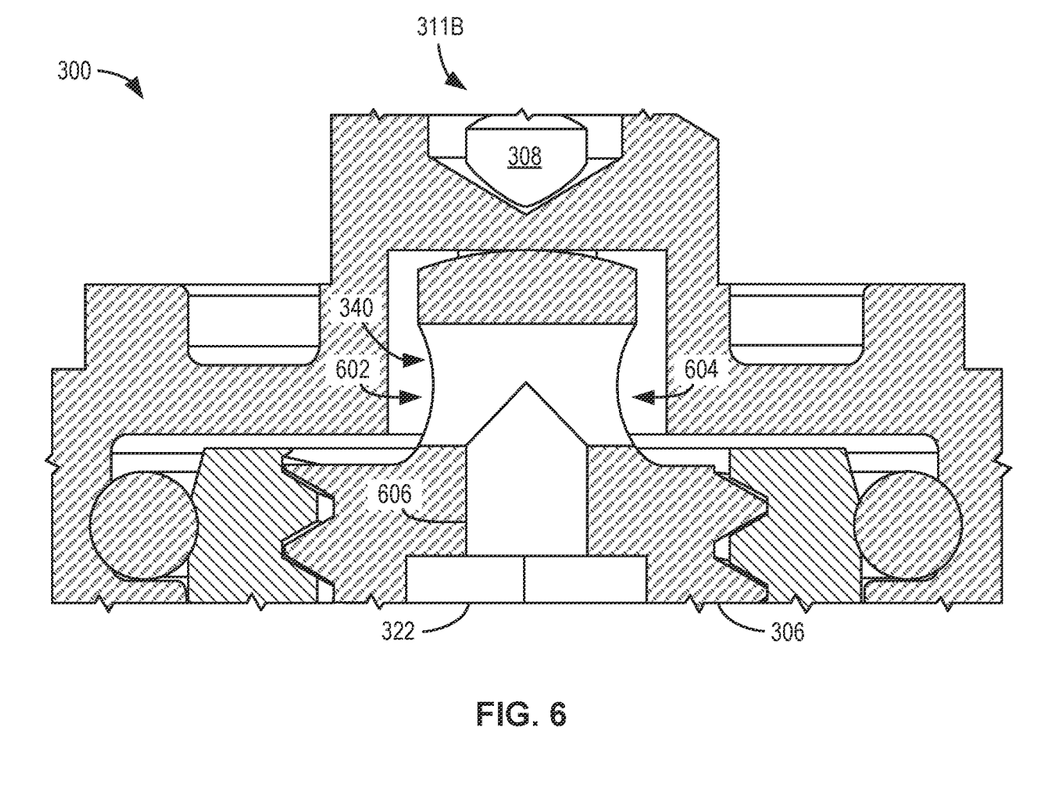
FIG. 6 is a second cross-sectional view of the second example valve disk assembly of FIGS. 3, 5A, and/or 5B.

FIG. 6 is a second cross-sectional view of a portion of the second valve disk assembly 300 of FIGS. 3, 5A, and/or 5B. In this example, the second cross-sectional view is taken along line A-A of FIG. 5A. In the illustrated example of FIG. 6, the opening 340 of the disk cap 306 is shown extending between first and second sides 602, 604 of the disk cap 306. Further, the opening 340 is fluidly coupled to the first hex feature 322 of the disk cap 306 via an example channel 606 extending longitudinally in the disk cap 306 (e.g., perpendicularly to the opening 340). As a result, fluid entering the first hex feature 322 (e.g., from the orifice 174 of the seat 118 of FIG. 1, from the downstream portion 124 of the fluid passageway 108 of FIG. 1, etc.) can flow through the channel 606 to the opening 340, and the fluid can exit the opening 340 via the first and second sides 602, 604. In some such examples, the fluid can further flow through the cavity 308 to the outlet portion 311B and, thus, to the first balance chamber portion 160 via the balance passage 168 of FIG. 1. While the opening 340 in FIG. 6 is a through-hole extending (e.g., fully extending) between the first and second sides 602, 604 of the disk cap 306, in some examples, the opening 340 can partially extend through the disk cap 306 (e.g., from the channel 606 to the first side 602, from the channel 606 to the second side 604, etc.).

Figure 7A:
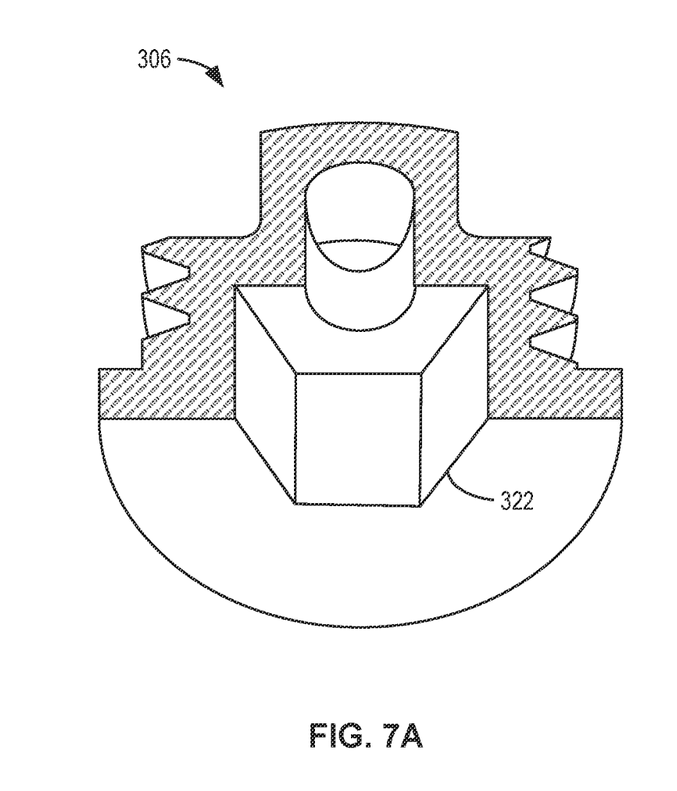
FIG. 7A is a cross-sectional view of an example disk cap of the second example valve disk assembly of FIGS. 3, 5A, 5B, and/or 6.

FIG. 7A is a cross-sectional view of the example disk cap 306 of the second example valve disk assembly 300 of FIGS. 3, 5A, 5B, and/or 6. In some examples, the disk cap 306 can be removed from the disk 304 of FIGS. 3, 5A, 5B, and/or 6 by inserting a tool (e.g., a hand tool and/or a power tool) into the first hex feature 322 of the disk cap 306 and rotating the tool to unthread the disk cap 306 from the disk 304. In some examples, removal of the disk cap 306 from the disk 304 facilitates servicing (e.g., repair, replacement, etc.) of the second valve disk assembly 300 and/or the stem 128 of FIG. 1.

Figure 7B:
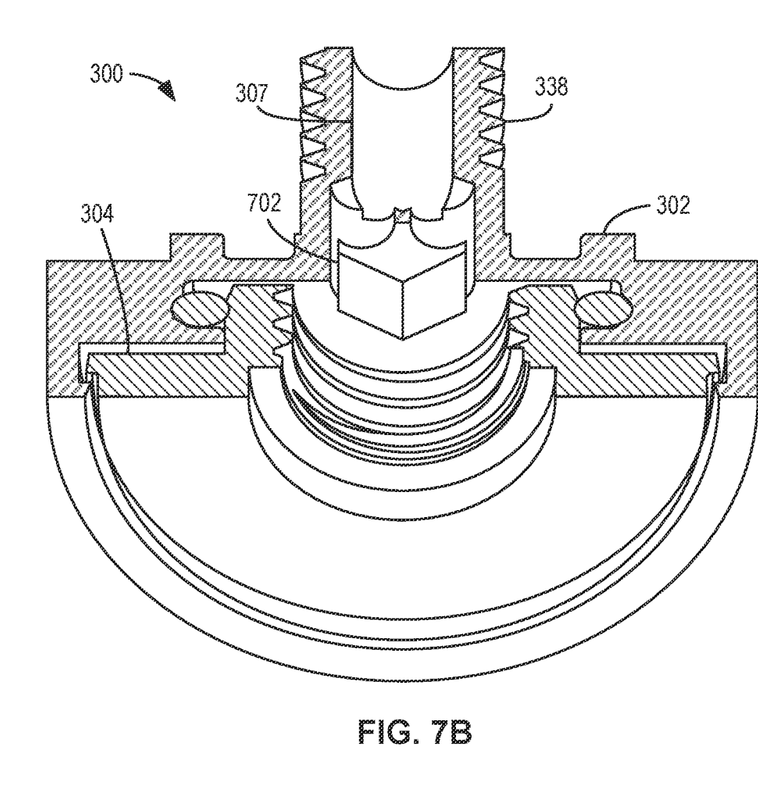
FIG. 7B is a cross-sectional view of the second example valve disk assembly of FIGS. 3, 5A, 5B, and/or 6 with the disk cap removed.

FIG. 7B is a cross-sectional view of the second example valve disk assembly 300 of FIGS. 3, 5A, 5B, and/or 6 with the disk cap 306 removed. In the illustrated example of FIG. 7B, when the disk cap 306 is removed, the disk 304 can also be removed from the disk holder 302 to facilitate servicing (e.g., repair and/or replacement) of the disk 304. Additionally, removal of the disk cap 306 from the disk 304 exposes and/or enables access to a second example hex feature 702 defined in the inner surface 307 of the disk holder 302. In some examples, a second tool (e.g., a second hand tool and/or a second powered tool) having a shape complementary to a shape of the second hex feature 702 can be used to remove the second valve disk assembly 300 from the stem 128 of FIG. 1 (e.g., for servicing of the second valve disk assembly 300 and/or the stem 128). For example, the second tool can be inserted into the second hex feature 702 and rotated to unthread the threaded portion 338 of the disk holder 302 from a corresponding threaded portion of the stem 128.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

From the foregoing, it will be appreciated that example systems, apparatus, articles of manufacture, and methods have been disclosed that enable pivoting and/or rotation of an example disk relative to an example disk holder of an example valve disk assembly of an example pressure regulator. As a result, examples disclosed herein can compensate for possible misalignment between a seat of the pressure regulator and a stem rigidly coupled to the disk holder, thereby enabling the disk to sealably engage the seat without necessitating tilt of the stem and/or excessive build-up pressures when the disk contacts the seat. Additionally, examples disclosed herein provide a flow path (e.g., a through-hole, a cavity) through the valve disk assembly that enables sensing of pressure from an orifice of the seat while facilitating maintenance activities for the pressure regulator. For example, examples disclosed herein implement one or more example hex features (e.g., angled surfaces) along the flow path, where the hex feature(s) facilitate installation and/or removal of the valve disk assembly (and/or one or more components thereof) from the stem. Disclosed systems, apparatus, articles of manufacture, and methods are accordingly directed to one or more improvement(s) in the operation of a machine or other electronic and/or mechanical device.

Example pressure regulators with self-aligning valve disk assemblies are disclosed herein. Further examples and combinations thereof include the following:

Example 1 includes a pressure regulator comprising a valve body defining a fluid passageway between an inlet and an outlet, a seat positioned in the fluid passageway, a stem movable relative to the seat, and a disk assembly coupled to the stem, the disk assembly including a disk holder defining a cavity, a retainer positioned in the cavity, the retainer including a first curved surface, and a disk positioned in the cavity and extending circumferentially around the first curved surface, a second curved surface of the disk complementary to the first curved surface such that the disk is pivotable and rotatable about the first curved surface to enable the disk to sealably engage the seat.

Example 2 includes the pressure regulator of example 1, wherein the disk includes a third curved surface complementary to a curved inner sidewall of the disk holder.

Example 3 includes the pressure regulator of example 2, further including a groove defined in the third curved surface, the groove extending circumferentially around the disk, and an O-ring positioned in the groove, the O-ring to provide a seal between the disk and the disk holder.

Example 4 includes the pressure regulator of example 1, wherein the disk is pivotable up to 2 degrees from a pivot plane.

Example 5 includes the pressure regulator of example 1, further including a through-hole extending longitudinally through the retainer, the through-hole fluidly coupled to a balance passage of the stem.

Example 6 includes the pressure regulator of example 5, further including a hex feature defined in the through-hole, the hex feature to facilitate removal of the disk assembly from the stem.

Example 7 includes the pressure regulator of example 1, wherein the retainer is positioned in an aperture extending between an inner surface and an outer surface of the disk holder, the retainer separate from the disk holder.

Example 8 includes a pressure regulator comprising a valve body defining a fluid passageway between an inlet and an outlet, a seat positioned in the fluid passageway, a stem movable relative to the seat, and a disk assembly coupled to the stem, the disk assembly including a disk holder defining a cavity, a disk cap positioned in the cavity, a first surface of the disk cap to engage a second surface of the disk holder such that the disk cap is pivotable and rotatable relative to the disk holder, and a disk positioned in the cavity and extending circumferentially around the disk cap, the disk to pivot with the disk cap to sealably engage the seat.

Example 9 includes the pressure regulator of example 8, wherein the first surface is curved and the second surface is substantially flat.

Example 10 includes the pressure regulator of example 8, wherein the disk cap includes a threaded outer surface, the disk includes a threaded inner surface, the threaded outer surface to engage the threaded inner surface to removably couple the disk cap to the disk.

Example 11 includes the pressure regulator of example 8, further including a recess defined in an inner surface of the disk holder, the recess extending circumferentially around the disk, and an O-ring positioned in the recess, the O-ring to provide a seal between the disk and the disk holder.

Example 12 includes the pressure regulator of example 8, wherein the disk holder includes a retaining tab extending into the cavity, the retaining tab to retain the disk in the cavity.

Example 13 includes the pressure regulator of example 8, further including a hex feature defined in the disk cap, the hex feature to facilitate removal of the disk cap from the disk.

Example 14 includes the pressure regulator of example 13, wherein the hex feature is a first hex feature, further including a second hex feature defined in the disk holder, the second hex feature accessible when the disk cap is removed from the disk, the second hex feature to facilitate removal of the disk assembly from the stem.

Example 15 includes the pressure regulator of example 13, further including an opening extending through the disk cap, the opening to fluidly couple the hex feature to an outlet portion of the cavity.

Example 16 includes the pressure regulator of example 15, wherein the hex feature extends along a first direction of the disk cap, the opening to extend along a second direction perpendicular to the first direction.

Example 17 includes a valve disk assembly for a pressure regulator, the valve disk assembly comprising a disk holder defining a cavity, a retainer positioned in the cavity, the retainer including a first curved surface, and a disk positioned in the cavity and extending circumferentially around the first curved surface, a second curved surface of the disk complementary to the first curved surface such that the disk is pivotable and rotatable about the first curved surface.

Example 18 includes the valve disk assembly of example 17, further including a through-hole extending longitudinally through the retainer, a hex feature defined in the through-hole.

Example 19 includes the valve disk assembly of example 17, further including a groove defined in a third curved surface of the disk holder, the groove extending circumferentially around the disk, and an O-ring positioned in the groove, the O-ring to provide a seal between the disk and the disk holder.

Example 20 includes the valve disk assembly of example 17, wherein the disk is pivotable up to 2 degrees from a pivot plane.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A pressure regulator comprising:
   a valve body defining a fluid passageway between an inlet and an outlet;
   a seat positioned in the fluid passageway;
   a stem movable relative to the seat; and
   a disk assembly coupled to the stem, the disk assembly including:
   a disk holder defining a cavity;

a retainer positioned in the cavity, the retainer including a first curved surface; and a disk positioned in the cavity and extending circumferentially around the first curved surface, a second curved surface of the disk complementary to the first curved surface such that the disk is pivotable and rotatable about the first curved surface to enable the disk to sealably engage the seat.

2. The pressure regulator of claim 1, wherein the disk includes a third curved surface complementary to a curved inner sidewall of the disk holder.

3. The pressure regulator of claim 2, further including:
a groove defined in the third curved surface, the groove extending circumferentially around the disk; and
an O-ring positioned in the groove, the O-ring to provide a seal between the disk and the disk holder.

4. The pressure regulator of claim 1, wherein the disk is pivotable up to 2 degrees from a pivot plane.

5. The pressure regulator of claim 1, further including a through-hole extending longitudinally through the retainer, the through-hole fluidly coupled to a balance passage of the stem.

6. The pressure regulator of claim 5, further including a hex feature defined in the through-hole, the hex feature to facilitate removal of the disk assembly from the stem.

7. The pressure regulator of claim 1, wherein the retainer is positioned in an aperture extending between an inner surface and an outer surface of the disk holder, the retainer separate from the disk holder.

8. A pressure regulator comprising:
a valve body defining a fluid passageway between an inlet and an outlet;
a seat positioned in the fluid passageway;
a stem movable relative to the seat; and
a disk assembly coupled to the stem, the disk assembly including:
a disk holder defining a cavity, the disk holder including a retaining tab extending into the cavity;
a disk cap positioned in the cavity, a first surface of the disk cap to engage a second surface of the disk holder such that the disk cap is pivotable and rotatable relative to the disk holder; and
a disk positioned in the cavity and extending circumferentially around the disk cap, the disk to pivot with the disk cap to sealably engage the seat, the retaining tab to retain the disk in the cavity.

9. The pressure regulator of claim 8, wherein the first surface is curved and the second surface is substantially flat.

10. The pressure regulator of claim 8, wherein the disk cap includes a threaded outer surface, the disk includes a threaded inner surface, the threaded outer surface to engage the threaded inner surface to removably couple the disk cap to the disk.

11. The pressure regulator of claim 8, further including:
a recess defined in an inner surface of the disk holder, the recess extending circumferentially around the disk; and
an O-ring positioned in the recess, the O-ring to provide a seal between the disk and the disk holder.

12. The pressure regulator of claim 8, further including a hex feature defined in the disk cap, the hex feature to facilitate removal of the disk cap from the disk.

13. The pressure regulator of claim 12, wherein the hex feature is a first hex feature, further including a second hex feature defined in the disk holder, the second hex feature accessible when the disk cap is removed from the disk, the second hex feature to facilitate removal of the disk assembly from the stem.

14. The pressure regulator of claim 12, further including an opening extending through the disk cap, the opening to fluidly couple the hex feature to an outlet portion of the cavity.

15. The pressure regulator of claim 14, wherein the hex feature extends along a first direction of the disk cap, the opening to extend along a second direction perpendicular to the first direction.

16. A valve disk assembly for a pressure regulator, the valve disk assembly comprising:
a disk holder defining a cavity;
a retainer positioned in the cavity, the retainer including a first curved surface; and
a disk positioned in the cavity and extending circumferentially around the first curved surface, a second curved surface of the disk complementary to the first curved surface such that the disk is pivotable and rotatable about the first curved surface.

17. The valve disk assembly of claim 16, further including a through-hole extending longitudinally through the retainer, a hex feature defined in the through-hole.

18. The valve disk assembly of claim 16, further including:
a groove defined in a third curved surface of the disk holder, the groove extending circumferentially around the disk; and
an O-ring positioned in the groove, the O-ring to provide a seal between the disk and the disk holder.

19. The valve disk assembly of claim 16, wherein the disk is pivotable up to 2 degrees from a pivot plane.

* * * * *